Aug. 21, 1923.
E. B. PRESTON
1,465,864
ATTACHMENT FOR MOTOR VEHICLES
Filed Nov. 3, 1922
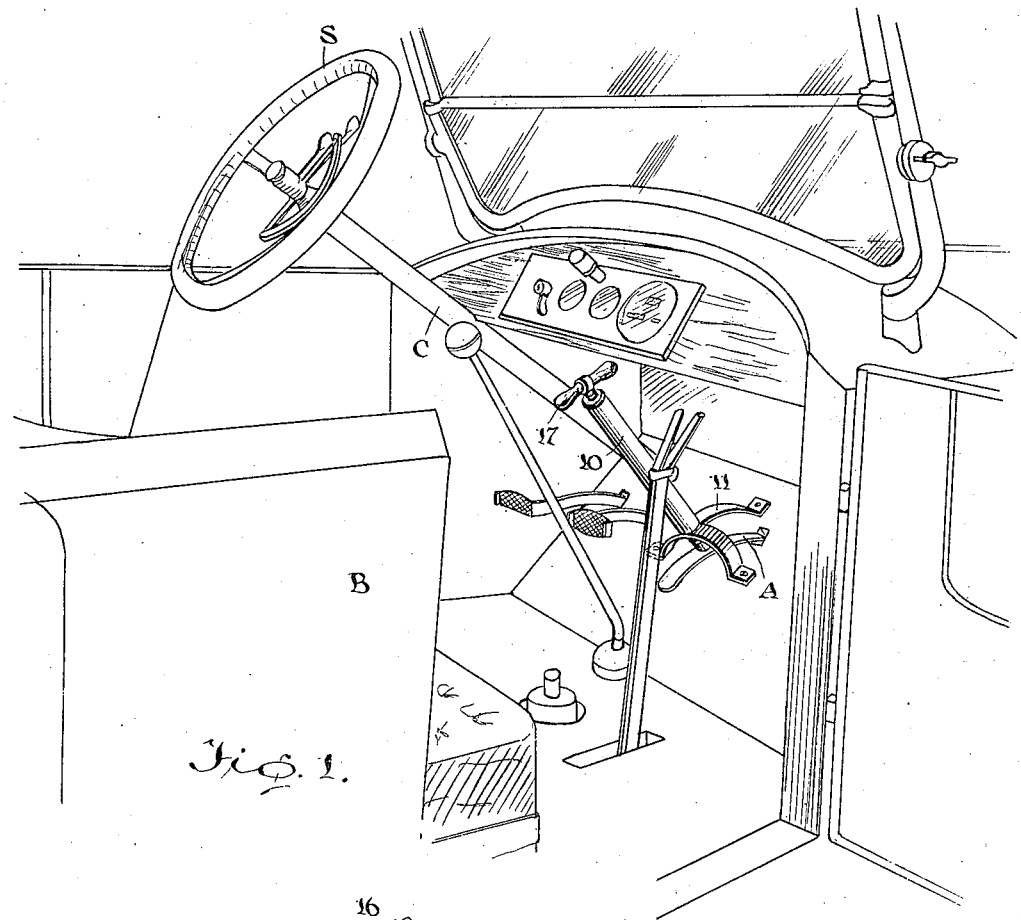
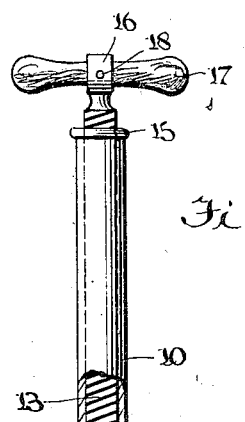
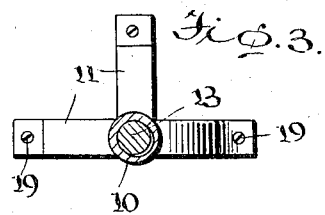
WITNESSES
INVENTOR
E. B. Preston,
BY
ATTORNEYS Patented Aug. 21, 1923.

1,465,864

UNITED STATES PATENT OFFICE.

EDITH B. PRESTON, OF MEXICO, MISSOURI.

ATTACHMENT FOR MOTOR VEHICLES.

Application filed November 3, 1922. Serial No. 598,871.

*To all whom it may concern:*

Be it known that I, EDITH B. PRESTON, a citizen of the United States, and a resident of Mexico, in the county of Audrain and State of Missouri, have invented certain new and useful Improvements in Attachments for Motor Vehicles, of which the following is a specification.

This invention relates to an attachment for motor vehicles.

The present invention more particularly relates to the accelerator control of internal combustion engines on motor vehicles.

As is well known the accelerator control usually consists in a pedal which is provided on the motor vehicle and is adapted to be operated by the driver of the motor vehicle. The accelerator is used to a great extent for controlling the speed of the associated engine. At times the accelerator is depressed a considerable period and this continued use of the accelerator tires the operator considerably. Also it has been found that by continuously depressing the accelerator pedal that the shoe soles of the operator are worn at the point of contact with the pedal and sometimes callouses upon the bottom of the feet are brought about in this manner.

Having the above in view it is the object of the present invention to provide means or attachment adapted to permit the operator to use one of his hands for operating the accelerator pedal.

It is also an important object of the invention that the attachment be adapted to be adjustable for holding the pedal in any position desired relative to its upward and downward movement.

Other objects, and objects relating to details of construction will hereinafter appear.

The invention is illustrated by way of example in the accompanying drawings, in which:—

Figure 1 is a detailed perspective view showing the forward end of a motor vehicle and the present invention applied.

Figure 2 is a view in front elevation of the present attachment when applied and with parts shown in section in order to more clearly illustrate the same.

Figure 3 is a transverse sectional view of the present attachment.

Referring to the drawings more particularly in Figure 1, B indicates generally the body of an automobile, C the steering column, S the steering wheel, and A the accelerator pedal. This pedal as shown is of well known construction. Also it is to be understood that the present device is applicable to other forms of pedals.

In carrying out the present invention there is provided a tubular member or casing 10 which terminates at its one end in preferably three prongs 11, each of which is as shown semi-circular in shape and terminating in its free end in a laterally extending portion 12. The casing or tubular member 10 is interiorly threaded and adapted to receive the threaded stem or rod 13. The threads upon the rod and upon the interior of the member 10 are preferably of the worm type, and the rod 13 terminates at its lower end in an unthreaded portion 14 which is adapted to engage upon the lever or pedal A. The upper end of the casing or tubular member 10 may be provided with a cap 15 which is provided with a suitable opening through which a rod 13 may pass. The upper end of the rod 13 terminates in an eye 16 in which there is positioned a handle 17, said handle being preferably of the shape shown and secured by a ratchet or pin 18. In mounting the attachment, the same is positioned as illustrated in Figure 1 of the drawings, and screws 19 may be employed for holding the same in position.

As is obvious with the attachment positioned, as shown in Figure 1, the same may be utilized for adjustably lowering and raising the pedal A. It should be here noted that the means shown for operating the pedal A is particularly valuable when it is desired to maintain the lever A in a lowered position for a considerable period. By the use of the screw rod 13, the pedal may be either quickly raised or lowered, or it may be closely adjusted in any position desired. Also by positioning the attachment, as shown and providing the legs for supporting the same, that is, the extensions or tangs 11, the attachment will not interfere with the operation of the pedal A by the foot of the driver should the driver so prefer. In other words, the driver may operate the pedal A by one foot in cases where it is desired to lower the pedal for only a short interval, and he may use the rod 16 for adjustably lowering or raising the same and maintaining the lever in the position desired for a long period.

I claim:—

1. In combination, a foot pedal, means whereby a tubular member may be supported in an upstanding position so that its lower end is in alignment with the foot pedal, a screw rod mounted within the casing or tubular member and adapted to be operated for depressing said foot pedal.

2. In combination, a foot pedal, means whereby a tubular member may be supported in an upstanding position so that its lower end is in alignment with the foot pedal, a screw rod mounted within the casing or tubular member, said screw rod extending from the upper end of the casing, and a handle carried thereby whereby the same may be rotated for adjustably depressing said foot pedal.

3. An attachment of the character described, comprising a tubular member terminating at its one end in a plurality of divergent legs, a screw rod threaded through said tubular member, and a handle carried at one end of the screw rod.

4. An attachment of the character described comprising a tubular member, means carried at one end of the member whereby the same may be secured to support a screw rod threaded through said tubular member, and a handle carried at one end of the screw rod, for the purpose described.

EDITH B. PRESTON.